United States Patent [19]
Moebius

[11] 3,893,720
[45] July 8, 1975

[54] CONSTRICTOR RING JOINT

[76] Inventor: Kurt O. Moebius, P.O. Box 2339, Palos Verdes Peninsula, Calif. 90274

[22] Filed: Feb. 9, 1973

[21] Appl. No.: 331,319

[52] U.S. Cl. ................ 285/187; 29/508; 29/520; 285/329; 285/382.2; 285/DIG. 6
[51] Int. Cl. ............................................. F16l 13/14
[58] Field of Search ............. 285/382.2, 382.1, 382, 285/329, 173, 187, 255, 256, 382.7, DIG. 6; 403/281, 285, 284; 29/520, 508

[56] References Cited
UNITED STATES PATENTS

| | | | |
|---|---|---|---|
| 2,741,498 | 4/1956 | Elliott | 285/173 |
| 3,149,860 | 9/1964 | Hallesy | 285/382 X |
| 3,239,250 | 3/1966 | Fonda-Bonardi | 285/187 |
| 3,429,587 | 2/1969 | Kish | 285/382.2 X |
| 3,498,648 | 3/1970 | Hallesy | 285/382.2 X |
| 3,674,292 | 7/1972 | Demler | 285/382 |
| 3,675,949 | 7/1972 | Dawson | 285/382.2 X |

FOREIGN PATENTS OR APPLICATIONS

| | | | |
|---|---|---|---|
| 986,617 | 4/1951 | France | 285/255 |
| 1,027,019 | 3/1958 | Germany | 285/187 |
| 64,381 | 6/1955 | France | 285/382.2 |
| 1,560,640 | 2/1969 | France | 285/382 |

Primary Examiner—Thomas F. Callaghan
Attorney, Agent, or Firm—Lyon & Lyon

[57] ABSTRACT

A constrictor ring tube joint in which an outer tubular member is locally compressed against an inner tubular member at a pair of spaced zones to effect a seal at each zone and a mechanical interlock at, at least one of the zones, one of the tubes being corrugated between the zones to compensate for difference in the coefficients of expansion of the materials comprising the tubes.

4 Claims, 5 Drawing Figures

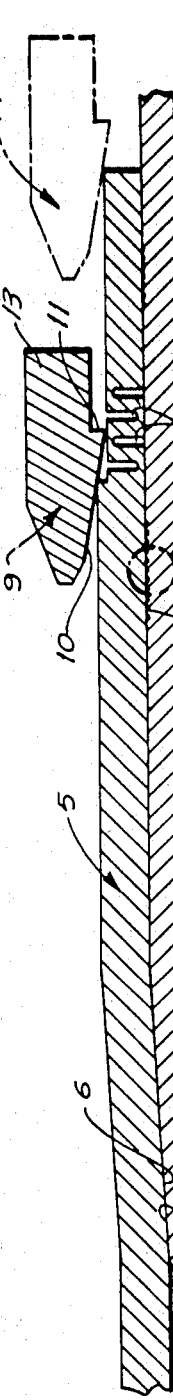
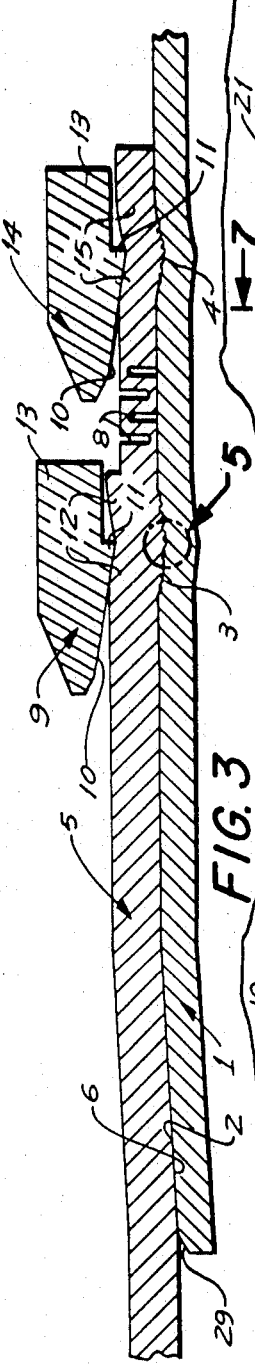
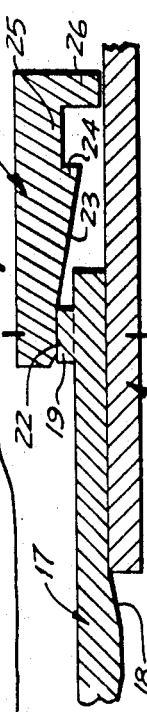
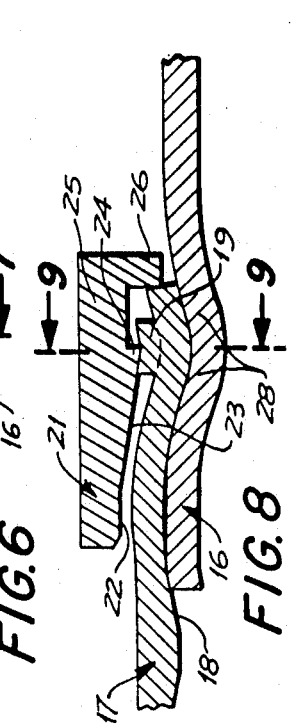
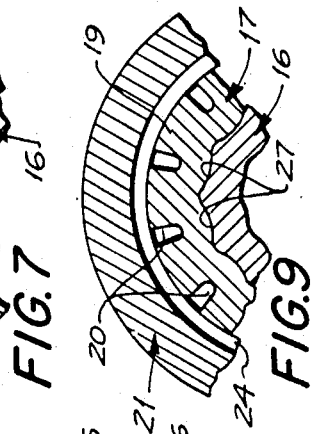
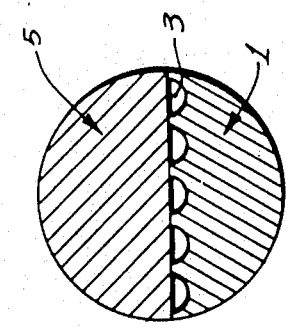
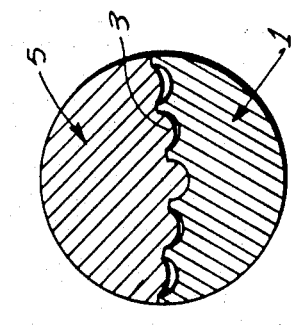
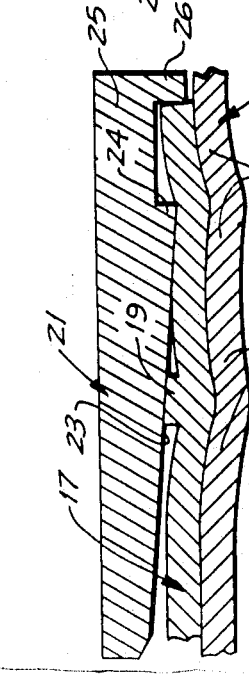

CONSTRICTOR RING JOINT

This invention is related to a copending application, Ser. No. 266,055, filed June 26, 1972 for CONSTRICTOR RING AND TUBE JOINT, issued Aug. 6, 1974, U.S. Pat. No. 3,827,727 which is directed to a tube joint wherein an outer tube or union collar fitted on an inner tube is compressed radially by a constrictor collar which remains in place to effect a permanent seal and to interlock the tubes. The present invention is directed to constrictor ring joints capable of withstanding particularly severe conditions of use such as may exist if the materials comprising the members united by the joint have different coefficients of expansion.

This invention relates to a constrictor ring joint and is summarized in the following objects:

First, to provide a constrictor ring joint which is adapted to effect a mechanical connection and seal between tubular members at spaced zones capable of withstanding extreme conditions of use.

Second, to provide a constrictor ring tube joint which is particularly adapted to effect a mechanical connection and seal between tubular members formed of dissimilar metals at a pair of spaced zones and includes novel means which compensate for differences in the coefficients of expansion of the metals throughout a wide temperature range while minimizing stress on the mechanical connections and seals.

DESCRIPTION OF THE FIGURES

FIG. 1 is a fragmentary longitudinal sectional view showing a pair of tubes partially telescoped prior to application of a constrictor ring.

FIG. 2 is a similar sectional view showing a first constrictor ring in its initial position and a second constrictor ring in broken lines.

FIG. 3 is a similar view showing the completed tube joint.

FIG. 4 is an enlarged fragmentary sectional view taken within circle 4 of FIG. 2.

FIG. 5 is an enlarged fragmentary sectional view taken within circle 5 of FIG. 3.

Reference is first directed to FIGS. 1 through 5. The construction here illustrated is particularly suited for the joining of a pair of tubes formed of metals having different coefficients of expansion and subject to wide temperature variations; for example, large Dewar flasks, in which it is desired to use one metal such as stainless steel for the inner wall and another metal, such as aluminum for the outer wall. However, it should be understood that the tube joint may be used for connecting tubes formed of the same metal. Also, the embodiment here illustrated is particularly suited for tubes of large diameter, but again is not limited thereto.

The tube joint illustrated in FIGS. 1 through 5 includes an inner tube 1 which may be stainless steel and may be provided with a tapered portion 2 and bevel 2a; or the impaired portion may be omitted. Spaced axially from the end is a first serration set 3 and spaced axially from the first serration set is a second serration set 4. The serrations comprising each set are circular and are of relatively small axial and radial dimension. For example, but not by way of limitation, the serrations may be spaced 0.012 inches and have a radial depth of 0.006 inches. In the drawings, the dimensions of the serrations are exaggerated for purposes of illustration.

The tube joint includes an outer tube 5 which may be formed of aluminum and includes a tapered zone 6 which mates with the tapered end 2 of the inner tube. The outer tube extends axially over the serration sets 3 and 4 to a point beyond the second serration set. The portion of the outer sleeve extending inwardly from its extremity to a point near the first serration set 3 is externally reduced as indicated by 7. The region between the two serration sets is provided with corrugations 8 which may be formed by means of external and internal channels. Serration sets may be placed in the outer tube 5 instead of the inner tube 2.

A first constrictor ring 9 is provided with a frustoconical bore 10 terminating at its reduced or trailing end to form a shoulder 11. The diameter of the reduced end of the bore 10 is dimensioned to slide over the reduced portion 7 and to be forced over the outer tube to form a first constricted zone 12 in which the inner surface of the outer tube 5 is pressed into the first serration set 3 to form a seal with the inner tube and also to provide a mechanical interlock. The first constrictor ring 9 continues from the shoulder 11 and forms a cylindrical portion 13 which clears the outer tube.

The radial dimensions of the constrictor ring 9 and the material selected for its construction are such that the force required to constrict the outer tube and, to some extent, constrict the inner tube is less than the strength of the constrictor ring; that is, any expansion that may occur in the constrictor ring is preferably well within its elastic limit so that when the constrictor ring is in place, it maintains a constricting force on the outer tube 5 as well as the inner tube 1. However, in some cases, some permanent expansion of the constrictor ring may be tolerated. The rearward extension 13 adds to the strength of the constrictor ring.

The reduced portion 7 of the outer tube receives a second constrictor ring 14 similar in shape in that it is provided with a frusto-conical bore 10, a trailing shoulder 11 and a cylindrical rearward extension 13. As the loads required of the second constrictor ring may be less than the first constrictor ring, the second constrictor ring may have a lesser outside diameter. When the second constrictor ring 14 is forced onto the reduced portion 7, the reduced portion and the underlying inner tube are depressed in the region of the second serration set 4 to form a second constricted zone 15.

Assembly of the constrictor ring tube joint shown in FIGS. 1 through 5 is as follows:

The two tubes are pressed axially to press the tapered end 2 of the inner tube tightly against the tapered zone 6 of the outer tube until a desired hoop stress is attained. Or if the wall thickness of the inner tube permits, the end portion may, initially, be cylindrical and caused to taper into conformity with the outer tube. The first constrictor ring 9 is then forced in place and, if desired, the second constrictor ring 14 may be forced in place. However, by reason of the corrugated portion or bellows portion 8, the second constrictor ring may be applied after the axial force is removed from the two tubes. If one of the tubes is formed of harder material than the other, and is provided with the serrations, the softer tube deforms into the serrations or at least a portion of the serrations to provide a tight seal. The corrugated or bellows portion 8 permits compensation for the difference in coefficient of expansion of two dissimilar metals so that there is a minimal axial stress at the constricted and sealed zones due to the effect of temperature change. The construction shown in FIGS. 1 through 5 is particularly adapted for connecting tubes of large diameter, but is not limited to such use.

While particular embodiments of this invention have been shown and described, it not intended to limit the same to the details of the constructions set forth, but instead, the invention embraces such changes, modifications and equivalents of the various parts and their relationships as come within the purview of the appended claims.

I claim:
1. A connector comprising:
a. an inner tube having an external cylindrical portion;
b. an outer tube having outer cylindrical surfaces and an internal cylindrical portion telescopingly received over the external cylindrical portion of the inner tube;
c. the outer tube having axially inward of its extremity, a first zone of greater wall thickness and external cylindrical diameter, and having at its extremity, a second zone of lesser wall thickness and external cylindrical dimension;
d. a first constrictor ring surrounding said first zone and having a tapered bore forming an abrupt shoulder at its smaller end, the first constrictor ring being of an inner diameter freely movable axially over the second zone and being internally dimensioned in the region of its shoulder to directly effect progressive localized constriction of both of the inner and outer tubes as the first constrictor ring is moved axially along the first zone thereby to form a first mechanical bond and seal between the tubes within the first zone;
e. a second separate constrictor ring surrounding said second zone and having a tapered bore and abrupt shoulder at its smaller end, the second constrictor ring being internally dimensioned in the region of its shoulder to directly effect progressive localized constriction of both the outer tube and inner tube as the second constrictor ring is moved axially along the second zone thereby to form a second mechanical bond and seal between the tubes within the second zone;
f. one of the tubes including between the first and second constrictor rings a set of corrugations to permit relative axial expansion and contraction of the tubes while maintaining intact the bonds and seals between the tubes.

2. A connector as defined in claim 1 wherein said inner and outer tubes are of different metals having different coefficients of expansion.

3. A tube connector as defined in claim 1, wherein:
a. the tubes are tapered in spaced relation to the localized zones and are held in forced mutual engagement by the interengagement of the tubes in the localized zones.

4. A tube connector as defined in claim 1, wherein:
a. the tubes are formed of metal having different hardness;
b. the harder tube is provided in the localized zones with serrations confronting the other tube and the other tube, when constricted, includes portions forced into the serrations to effect a mechanical interlock.

* * * * *